L. ARNTZ.
EYEGLASS MOUNTING.
APPLICATION FILED JUNE 28, 1922.
1,427,996.
Patented Sept. 5, 1922.
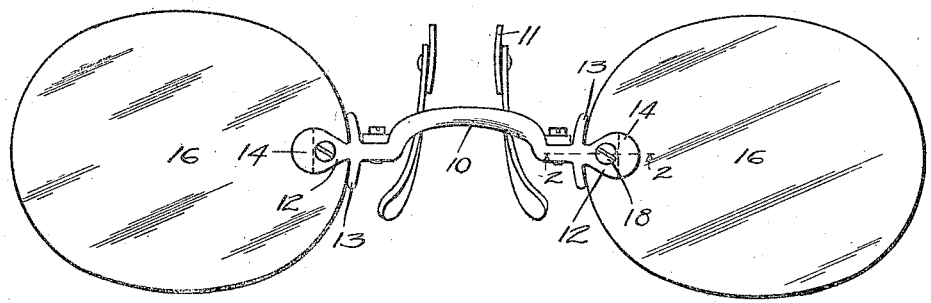
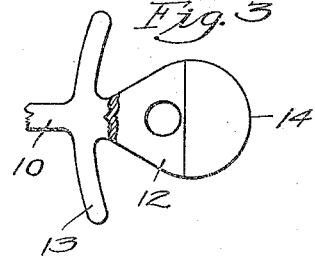
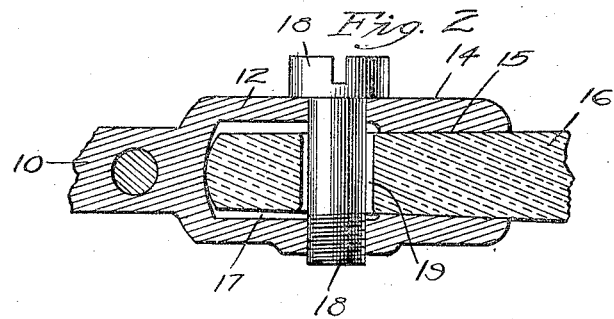
Witness
Lynn Latta
Inventor
Lew Arntz
By Bair & Freeman
Attys Patented Sept. 5, 1922.

1,427,996

UNITED STATES PATENT OFFICE.

LEW ARNTZ, OF DES MOINES, IOWA.

EYEGLASS MOUNTING.

Application filed June 28, 1922. Serial No. 571,415.

*To all whom it may concern:*

Be it known that I, LEW ARNTZ, a citizen of the United States, and a resident of Des Moines, in the county of Polk and State of Iowa, have invented a certain new and useful Eyeglass Mounting, of which the following is a specification.

My invention has to do with eye glass mountings, and it is my purpose to provide a mounting, having its parts so constructed and arranged as to reduce the likelihood of breakage of the glass or lens supported by the mounting.

More particularly, it is my object to provide such a mounting having members for engaging the lens or glass adapted to receive the lens between them, and to be secured thereto by means of a screw inserted through said members and the lens, which members are provided with flat-faced portions of substantial width, projecting substantially away from said screws and adapted to grip the glass or lens, so as to prevent the breaking of the lens on the line of the screw hole therein.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a front elevation of a pair of eye glasses, having a mounting embodying my invention.

Figure 2 shows a detailed, sectional view taken on the line 2—2 of Figure 1; and Figure 3 shows a front elevation of a portion of the mounting, parts being broken away.

It is well-known that where the ordinary eye-glass mountings are used without rims for the lenses, the lenses frequently break on a line extending across the screw hole therein. The screw hole is close to the edge of the lens, and so weakens the lens, that it is easily broken on such a line.

My purpose is to provide a mounting so constructed that the lens will not break on a line through the screw hole, but must be broken on a line farther from the edge of the lens, so that a much greater body of the glass must be broken, and hence breaking will not occur so often, because it requires a greater strain to cause the lens to break, when equipped with my mounting.

In the accompanying drawings, I have used the reference numeral 10 to indicate generally the bridge of an eye glass mounting of the rimless type.

Suitably supported are the guards 11. Projecting from the bridge are the ordinary ears or straps 12, adjacent to which are the braces 13 of ordinary construction.

My mounting has projecting from the straps or ears 12, the lugs 14, which extend away from the mounting substantial distances from the mounting and are provided on their inner surfaces with flat faces 15 adapted to engage the opposite sides of the lens or glass 16.

The ears 12 are spaced from the lens 16 as illustrated at 17. The ears 12 and lenses 16 are provided with suitable openings to receive the ordinary screw 18.

It will be noted that the projecting lugs or members 14 have considerable bearing space and project away from the mounting a sufficient distance, so that there is no likelihood of breaking the eye glasses on lines extended through the screw holes 19 therein.

Insomuch as eye glasses ordinarily break along the lines through the screws, the advantage of the lugs 14 will be obvious.

In actual tests, I have found that where my lugs are employed, much greater strain may be put on the lenses without breaking them, than can be done with the ordinary forms of mounting.

I claim as my invention:

The combination of lenses with an eye glass mounting, having a bridge, nose guards, spaced ears spaced from the lenses, said ears having lugs projecting away from the mounting provided with opposite flat faces forming bearings of substantial alignment for engaging the lenses for substantial spaces, spaced from the screw holes of the lenses, said lenses and ears having screw holes, and screws received in said holes.

LEW ARNTZ.